May 3, 1960 R. KARL 2,935,566

AUTOMATIC TELEPHONE MESSAGE RECEIVER AND RECORDER

Filed July 7, 1958 2 Sheets-Sheet 1

INVENTOR.
ROBERT KARL
BY
Jacob L. Kollin
ATTORNEY

May 3, 1960 R. KARL 2,935,566

AUTOMATIC TELEPHONE MESSAGE RECEIVER AND RECORDER

Filed July 7, 1958 2 Sheets-Sheet 2

INVENTOR
ROBERT KARL

BY Jacob L. Kollin
ATTORNEY

United States Patent Office 2,935,566

Patented May 3, 1960

2,935,566

AUTOMATIC TELEPHONE MESSAGE RECEIVER AND RECORDER

Robert Karl, Forest Hills, N.Y.

Application July 7, 1958, Serial No. 746,802

6 Claims. (Cl. 179—6)

My invention relates to sound recording and reproducing apparatus and particularly to an automatic telephone message receiver and recorder.

An important object of the invention is to provide such an apparatus for use in combination with a conventional telephone, whereby messages may be automatically transmitted and received.

Another object of my invention is to provide an apparatus which requires no conductive connection with the wiring of the telephone system.

Still another object of my invention is to provide means operable automatically upon the ringing of a telephone to answer the telephone and to record any messages received therethrough.

Yet another object of my invention is to provide a device of the above type, including means adapted to automatic cyclic carrying out of the various normal functions.

A further object of my invention is to provide a device which is simple, low in cost, readily manufactured, readily installed, and easily placed in proper operation by inexperienced persons.

A still further objection of my invention is to provide a device of the above type which is portable.

Other objects and advantages of my invention will be apparent during the course of the following description.

In the accompanying drawings, forming a part of this application, and in which like numerals are employed to designate like parts throughout the same, Fig. 1 is a partial view in perspective of the device according to the invention;

Figure 1:
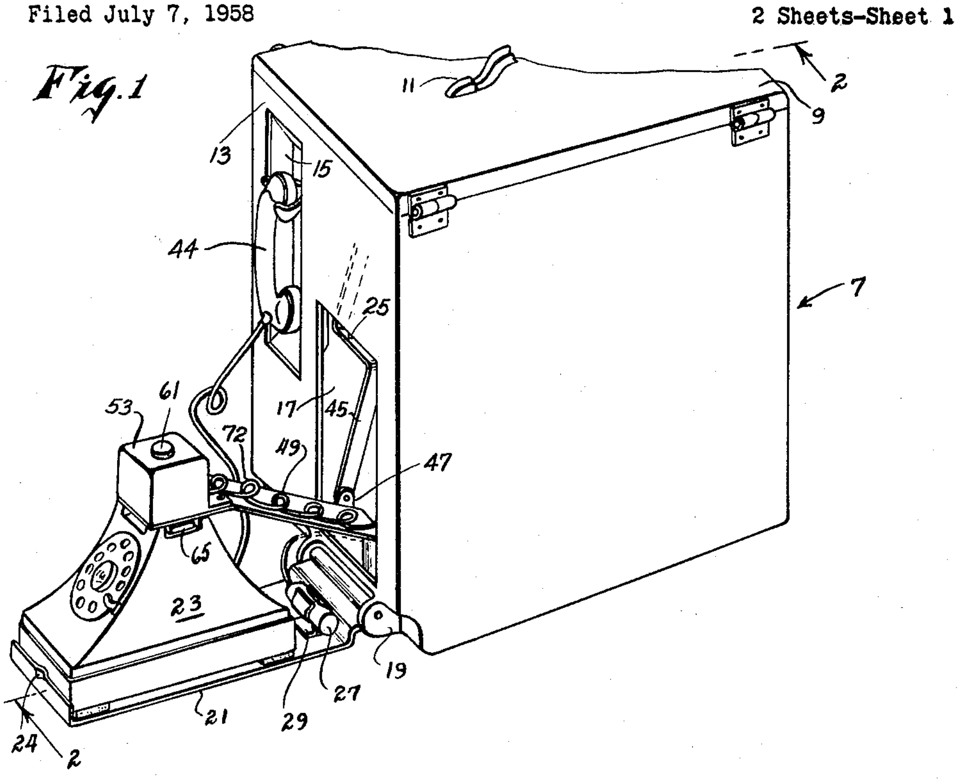

Referring now to the drawings in detail, there is shown a carrying case 7 for housing the device, provided with a hinged cover 9 and a carrying handle 11. The case, which may be made of metal, wood, or plastic material, has a front wall 13, formed with spaced rectangular openings 15 and 17. Pivoted below the bottom edge of opening 17 on hinge 19, which is suitably secured to wall 13, is a plate 21 which forms a platform for a telephone instrument 23, provided with a bell call box. The plate, which may be made of metal or plastic, is provided with an indent 24, which is adapted to engage with detent catch 25 when the telephone instrument is removed and the plate is swung to close opening 17. The plate is of a length sufficient to receive, in addition to the telephone instrument an induction pick-up coil 27 adjacent to the telephone instrument's base, the coil being permanently secured to plate 21 by means of bracket 29.

Secured with fasteners 31 to the rear face of front wall 13 is an open rectangular housing 33, whose open end edges register with those of opening 15. The housing may be made of metal or other suitable material. Closed end 35 of housing 33 is provided with spaced openings 37 and 39. A bracket 41 is attached to the exterior of box 33 below opening 37, and there is pivotally mounted thereon, at 38, forked arm 36, which is under tension of spring 40 secured to the arm and housing 33, at 42, on which may be hung telephone headset 44. The opening 15 and housing 33 thus provide a recess which protects from damage forked lever 36, while plate 21 serves to close opening 17 and protects the mechanism of the device when the latter is not in use or is carried from one location to another.

Pivoted at 43 to the other end of forked arm 39 is one end of an offset link 45, to whose other end is pivotally secured by means of angular extension 47 bent arm 49, which is pivotable at its lower end about a bracket 51 adjacent the bottom of front wall 13 of the carrying case. Secured to the other end of arm 49 is a solenoid housing 53, in which is mounted a solenoid 55, adapted to actuate displaceable rod 57. The rod is made of two parts, a non-magnetic part 59 of plastic material terminating at one end in a flange 61, its other end being secured to steel part 63 which bears a weighted metal strip 65. The strip, which weighs about eight ounces, suffices to depress switch buttons 71 of telephone instrument 23, when placed thereon, while clearing projections 69 thereof. The solenoid housing is formed with a base portion, which is defined by an inwardly extending peripheral flange 67. The base and the flange are so dimensioned that the solenoid housing may be supported on projections 69 of the telephone instrument base. Telephone instrument bases in universal use today are standardized and restricted to very few closely varied sizes. Therefore, flange 67 of solenoid housing 53 may be provided with a base which is of such dimensions that it will fit and rest on top of most bases, or a number of interchangeable housings may be provided, to conform to the size of the telephone instrument used in a particular locality.

The solenoid 36 can be placed on projections 69 of the telephone instrument when the latter is on plate 21, as shown, by suspending the handset 44 on forked arm 36 which will move against the tension of spring 40, thereby pulling offset link 45 upward and swinging arm 49 and the solenoid out of case 7, thereby causing strip 65, by virtue of its weight, to drop on switch buttons 71 of the instrument, depressing these and maintaining the telephone disconnected from the telephone system.

Figures 3, 4, 5, 6:
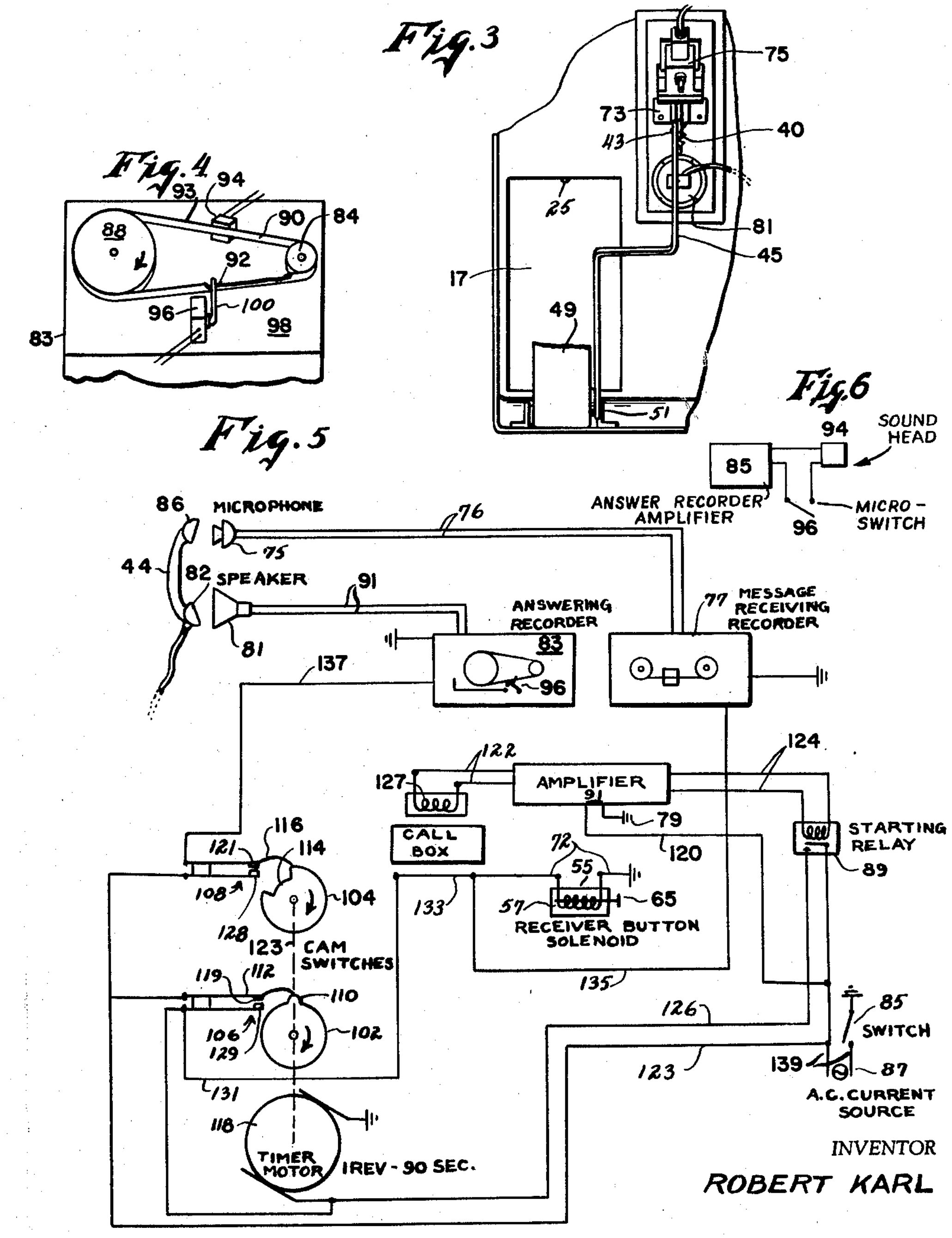
Fig. 3 is a cross-section view taken on line 3—3 of Fig. 2.
Fig. 4 is a detail of the answering mechanism.
Fig. 5 is a diagrammatic representation of the circuit and elements of the device.
Fig. 6 is another circuit detail.

Solenoid 55 is electrically connected to power amplifier 91 by means of flexible cable 72 in a manner shown in the circuit diagram of Fig. 5, and, when energized, lifts rod 57 and weighted metal strip 65, thereby releasing switch buttons 71 and connecting the telephone subscriber's circuit with the telephone system.

Figure 2:
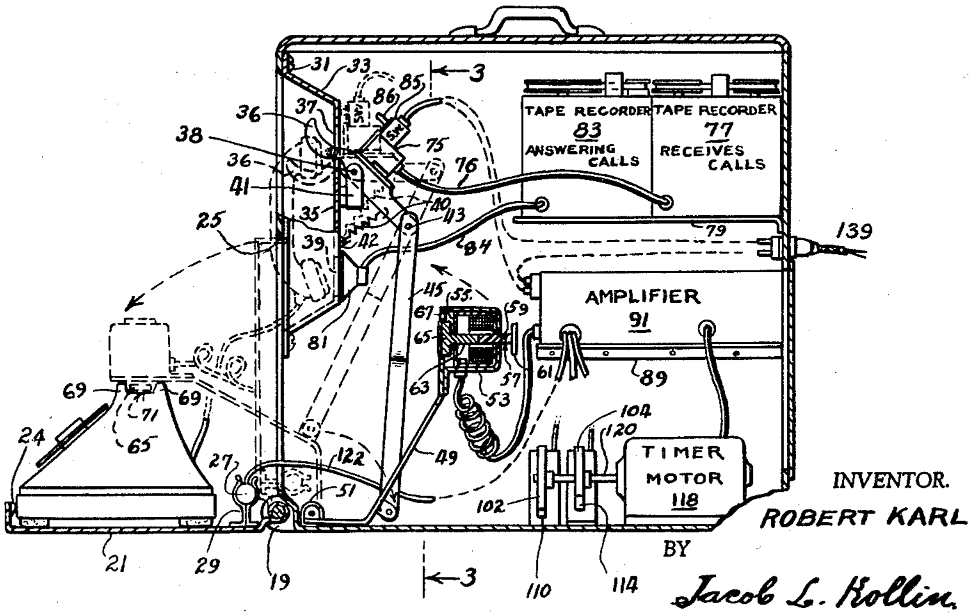
Fig. 2 is a view, partly in section, of the interior of the device.

Secured by means of bracket 73 to forked lever 36 is a microphone 75, which is connected by means of cable 76 to a conventional tape recorder 77 mounted on support 79 in the carrying case. This recorder serves to record incoming messages. For answering calls, there is secured to housing 33 a speaker 81, which is connected to a second recorder 83 by the cable 84. Thus, when the telephone handset 23 is hung on the forked end of lever 39 with its receiver above the transmitter, both latter elements are adjacent microphone 75 and speaker 81 respectively. A push-button switch 85 is secured to the housing of microphone 75 and serves to connect through a relay 89 the entire device to one leg of a power supply source 87 when lever 39 is moved into the position shown by dotted lines in Fig. 2, and push-button 86 is depressed by contact with housing 33. One terminal of switch 85 is grounded to metal support 79 of amplifier 91, while the other terminal is connected to one leg of A.C. current source 87. Current is thereby supplied to the input end of amplifier 91 through the common ground and conductor 120. Induction pick-up coil 27 is connected by conductors 122 and starting relay 89, by conductors 124, to amplifier 91 in such a manner that starting relay 89, can only be energized when a current is induced in the pick-up coil. When a call is received through instrument 23, i.e., when its bell rings, the current which energizes the bell induces such a current in pick-up coil 127. The current is amplified in amplifier 91, thus energizing starting relay 89, to initiate the cycle of operation. The relay closes the circuit to solenoid 55 through wires 131, 133, and 135, thus energizing the solenoid and causing it to raise rod 63 and weighted strip 65 off switch buttons 71 of the telephone instrument 23, and connecting the latter with the telephone system. The relay also connects the current source 87 through conductor 123 with one terminal of timer motor 118, the other terminal of which is grounded to the common ground 89. The timer motor 118 which is geared to rotate the cam switches in the direction shown, at one revolution for every 90 seconds, rotates cams 102 and 104 so that spring 112 is released from projection 110 and contact points 119 and 129 complete the circuit to message receiving recorder 77 through connections 131, 133 and 135. Simultaneously, spring 116 of switch 108 drops into recess 114 of cam 104, thus completing the circuit to, and activating recorder 83 through conductor 137. Recorder 83 employs an amplifier of known design and is constructed with a drive pulley 84 and an idler pulley 86, on which an endless sound tape 90 executes one revolution every fifteen seconds. The upper end of the tape is provided with an elongated notch 92, which extends along one-third of the tape's length. An answer message, instructing a caller to leave his message, is pre-recorded on the other two-thirds of the tape. A sound head 94 for picking up the pre-recorded message is secured to the top panel 98 of the recorder, and is connected in a series circuit with microswitch 96 to the input end of amplifier 85 of recorder 83. When arm 100 is in notch 92, the sound head circuit is open, being closed when arm 100 is raised by the tape's upper edge 93. Microswitch 96 permits a precise adjustment of the tape and timing of the answering message after recorder 83 is actuated by means of a timing mechanism which will be described below, so that the pre-recorded message will follow a few seconds after the recorder is started. The message can be "played" back through speaker 81 into the receiver 82 of handset 23.

The timing of both recorders is effected by means of cams 102 and 104, which actuate spring switches 106 and 108, respectively. Cam 102 is provided with a lug or projection 110, which, when in contact with spring 112, keeps switch 106 in open position. Cam 104 has a cutout portion 114, which allows spring 116 of switch 108 to enter it during its rotation, thus closing the switch. Both cams are operated in timed relationship by timer motor 118, to which they are connected by a common shaft shown diagrammatically at 123 in Fig. 5. When actuated, the timer shaft rotates at a speed of one revolution every ninety seconds, thus closing switch 106 for a corresponding length of time, and by means of cutout portion 114, switch 106 for fifteen seconds. Timer motor 118, through cam 102 allows current to be supplied to all the electrical parts of the device with the exception of power amplifier 91, when push-button switch 85 is closed by hanging the telephone hand set 44 on forked lever 36, provided that starting relay 89 has closed the circuit. Cam 102 therefore actuates message receiving recorder 77 when during its rotation the corresponding circuit is closed. Cam 104, however, during its travel, limits the current supply to recorder 83 to about 20 seconds, during which period the spring arm of switch 116 is in its recess 114.

Power amplifier 91 is operated independently of the timer mechanism and relay 89, being constantly supplied with electric current from current source 87 through wire 120 and the ground, as long as handset 44 is suspended on forked lever 36 and switch 85 is closed.

While I have found the above indicated time intervals sufficient for the operational cycles of the device, these intervals may be increased or decreased if desired by varying the speed of rotation of the timer shaft and the length of notch 92 in the sound tape 90.

The device is placed in operation by placing the telephone instrument 23 on plate 21, as shown, and connecting cord 139 with current source 87. Handset 44 is next removed from its cradle and is suspended on forked lever 36 with receiver 82 adjacent speaker 81 and transmitter 86 adjacent microphone 75. The weight of the handset moves lever 36 downward against the tension of spring 40, thereby depressing push-button 86 of switch 85 as the pushbutton comes in contact with housing 33. Current is thereby supplied to amplifier 91 through the common ground and wire 120. The movement of lever 36 causes arm 49 and solenoid 53 to swing out of case 7 by the displacement of connecting link 45, thus emplacing solenoid 53 on projections 69 of the telephone.

Induction pick-up coil 127 is connected by wires 122 and starting relay 89 by wires 124, to amplifier 91 in such a manner that starting relay 89 can only be energized when a current is induced in the pick-up coil. When a call is received through instrument 23, i.e., when its bell rings, the current which energizes the bell induces a current in pick-up coil 127. The current is amplified in amplifier 91, thus energizing starting relay 89 to initiate the cycle of operation. The relay connects the ungrounded leg of current source 87 through wire 126 with one terminal of timer motor 118, the other terminal of which is grounded to common ground 89. The timer motor which is geared to rotate the cam switches, in the direction shown, at one revolution for every 90 seconds, commences its operation so that the spring 112 is released from projection 110 and contact points 119 and 129 complete the circuit to, and actuating message receiving recorder 77 through, wires 131, 133, and 135, and the ground connection. Simultaneously, spring 116 of switch 108 drops into recess 114 of cam 104, thus completing the circuit to, and actuating recorder 83 through wire 137 and the ground connection. The relay also closes the circuit to solenoid 55 through wires 126, 131, 133 and 135, thus energizing the solenoid and causing it to lift steel part 63 of the solenoid rod strip 65 off switch buttons 71 of the telephone instrument 23, thus connecting the latter with the telephone system. Arm 100 of the microswitch in the forward end of elongated notch 92 of the tape, when cam 104 is in the position shown in the drawing, is raised after five seconds by edge 93 of the sound tape, thereby closing the circuit between the sound head and the input end of amplifier. As has previously been noted the microswitch is employed to effect a precise positioning of the message, to overcome a time lag inherent in the use of cams.

The person who made the telephone call is instructed through speaker 81, connected to recorder 83 by wires 91, and through receiver 82, to leave a message limited to about one minute. After cam 114 has traveled in the direction shown, for fifteen seconds, the switch arm of switch 116 moves out of recess 114, thereby opening contact points 121, 128, and disconnecting answering recorder 83. The message coming from transmitter 86 is then recorded through microphone 75 and wires 76 in message receiving recorder 77. Neither the answering nor the incoming messages need be limited to the periods indicated, since, as has been indicated, the operational periods of both recorders may be varied by the speed at which cams 102 and 104 revolve.

After the expiration of the allotted message-receiving period, cam 102 returns to its starting position as shown in Fig. 5, projection 110 opening the switch 112 and the recorder circuit of recorder 77, as well as the circuit of solenoid coil 55. Rod 57, and weighted metal strip 65, are thereby released by de-energized solenoid coil 55 and drop on switch buttons 71, thereby disconnecting telephone instrument 23 and placing it in condition to receive the next incoming call.

When the device is not in use or when it is desired to move it from one location to another, handset 44 is removed from forked lever 36, thereby causing spring 40 to pull the lever downwardly, thus retracting through link 45, arm 49, and solenoid 53, into carrying case 7. Telephone instrument 23 may then be removed from support plate 21 and opening 17 closed by swinging the plate and engaging indent 24 with detent catch 25. The device may then be disconnected from the current source 87.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

I claim:

1. A telephone answering and recording device, comprising in combination with a telephone instrument provided with a receiver-transmitter handset and weight-actuated switch; a housing for the device, solenoid means for operating the switch, comprising a solenoid emplaceable on the instrument above the switch, a weighted element depending downwardly from said solenoid for depressing the switch, a lever pivotable in said housing for suspending the handset, linkage operatively connecting said lever and said solenoid for emplacing said solenoid on the instrument when the handset is suspended on said lever, electrical means responsive to telephone ringing, a relay operated by said electrical means upon the ringing of the telephone, a timer motor initially connected to and operated by said relay for pulsing the timer motor, cams operative by said timer motor, switch elements controlled by said cams, whereby after initial pulsing of said timer motor one of said cams operates one of said switch elements for independently beginning a continuous rotation of said timer motor, said solenoid means being operative by said one cam for actuating the telephone instrument switch means to thereby connect the telephone instrument with the telephone system, a recording system operative by said cams and said switch elements for repeating a recorded message to the telephone and for receiving an incoming telephone message following the recorded message.

2. A telephone answering and recording device comprising in combination with a telephone instrument provided with a weight-actuated switch means, a cradle, and a receiver-transmitter handset, a housing for the device, suspension means for the handset in said housing, a solenoid device, means emplacing said solenoid device on said cradle when said handset is suspended on said suspension means for normally dis-establishing a telephone circuit, electrical means responsive to telephone ringing, a relay operated by said electrical means upon the ringing of the telephone, a timer motor initially connected to and operated by said relay for pulsing the timer motor, cams operative by said timer motor, switch elements controlled by said cams, whereby after initial pulsing of said timer motor one of said cams operates one of said switch elements for independently beginning a continuous rotation of said timer motor, means operative by said one cam for electrically operating said solenoid device and actuating the telephone instrument switch means, to thereby connect the instrument with the telephone line, a recording system operative by said cams and said switch elements for repeating a recorded message to the telephone and for receiving an incoming telephone message following the recorded message.

3. A telephone answering and recording device comprising in combination with a telephone instrument provided with a pushbutton weight-actuated switch operable by a transmitter-receiver handset received in the instrument's cradle, a casing for the device, a support for the telephone instrument, a lever pivotally secured in said casing for suspending the handset upon its removal from the cradle, a circuit controller actuable by said lever for normally dis-establishing a telephone circuit, said controller comprising a solenoid operatively connected to said lever and emplaceable upon the cradle when the handset is suspended on the lever, a weighted element extending downwardly from the solenoid and normally depressing the instrument's pushbutton switch, thereby dis-establishing the telephone circuit, electrical means responsive to telephone ringing, a relay operated by said electrical means upon the ringing of the telephone, a timer motor initially connected to and operated by said relay for pulsing the timer motor, cams operative by said timer motor, switch elements controlled by said cams, whereby after initial pulsing of said timer motor one of said cams operates one of said switch elements for independently beginning a continuous rotation of said timer motor and for energizing the solenoid, thereby raising said weighted element and releasing the pushbutton switch to establish a telephone circuit, a recording system operative by said cams and said switch elements for repeating a recorded message to the telephone and for receiving an incoming telephone message following the recorded message.

4. A telephone answering and recording device, comprising in combination with a telephone instrument provided with a pushbutton weight-actuated switch operable by a transmitter-receiver handset received in the instrument's cradle, a casing for the device, a retractable support for the telephone instrument, a lever pivotally secured to said casing for suspending the handset upon its removal from the cradle, a circuit controller actuable by said lever for normally dis-establishing a telephone circuit, a solenoid operatively connected to said lever and emplaceable upon the cradle when the handset is suspended on the lever, a weighted element extending downwardly from the solenoid and normally depressing the instrument's pushbutton switch, thereby dis-establishing the telephone circuit, a power amplifier having an input end and an output end, electrical means responsive to telephone ringing connected to said input end, a relay connected to said output end and operated by said electrical means through said amplifier upon the ringing of the telephone, a timer motor initially connected to and operated by said relay for pulsing the timer motor, a first cam operative by said timer motor, a first switch element controlled by said first cam, whereby said initial pulsing of said timer motor said first cam operates said first switch element for independently beginning a continuous rotation of said timer motor and for energizing the solenoid, thereby raising said weighted element and releasing the pushbutton switch to establish a telephone circuit, a second cam operative by said timer motor, a second switch element operative by said second cam during a part of a revolution of said first cam, an answering recorder operative by said second cam and said second switch elements for repeating a recorded message to the telephone for a predetermined length of time, and a message receiving recorder operative by said first cam and said first switch element for receiving an incoming telephone message following the recorded message, both said recorders being operated in timed relationship.

5. A telephone answering and recording device, comprising in combination with a telephone instrument provided with a pushbutton weight-actuated switch operable by a transmitter-receiver handset received in the instrument's cradle, a casing for the device, a retractable support for the telephone instrument, a lever pivotally secured to said casing for suspending the handset upon its removal from the cradle, a circuit controller actuable by said lever for normally dis-establishing a telephone circuit, a solenoid operatively connected to said lever and emplaceable upon the cradle when the handset is suspended on the lever, a weighted element extending downwardly from the solenoid and normally depressing the instrument's pushbutton switch, thereby dis-establishing the telephone circuit, a power amplifier having an input end and an output end, electrical means responsive to telephone ringing connected to said input end, a relay connected to said output end and operated by said electrical means through said amplifier upon the ringing of the telephone, a timer motor initially connected to and operated by said relay for pulsing the timer motor, a first cam operative by said timer motor, a first switch element controlled by said first cam, whereby after initial pulsing of said timer motor said first cam operates said first switch element for independently beginning a continuous rotation of said timer motor and for energizing the solenoid, thereby raising said weighted element and releasing the pushbutton switch to establish a telephone circuit, a second cam operative by said timer motor, a second switch element operative by said second cam during a part of a revolution of said first cam, an answering recorder operative by said second cam and said second switch element for repeating a recorded message to the telephone for a predetermined length of time, a message receiving recorder operative by said first cam and said first switch element for receiving an incoming telephone message following the recorded message and a power switch operable by said lever and connecting said power amplifier to an electric power source when the handset is suspended on the lever, said power switch further being connected in series with said relay, said solenoid and said switch elements.

6. A telephone answering and recording device, comprising in combination with a telephone instrument provided with a pushbutton weight-actuated switch operable by a transmitter-receiver handset received in the instrument's cradle, a casing for the device, a retractable support for the telephone instrument, a lever pivotally secured to said casing for suspending the handset upon its removal from the cradle, a circuit controller actuable by said lever for normally dis-establishing a telephone circuit, a solenoid operatively connected to said lever and emplaceable upon the cradle when the handset is suspended on the lever, a weighted element extending downwardly from the solenoid and normally depressing the instrument's pushbutton switch, thereby dis-establishing the telephone circuit, a power amplifier having an input end and an output end, electrical means responsive to telephone ringing connected to said input end, a relay connected to said output end and operated by said electrical means through said amplifier upon the ringing of the telephone, a timer motor initially connected to and operated by said relay for pulsing the timer motor, a first cam operative by said timer motor, a first switch element controlled by said first cam, whereby after initial pulsing of said timer motor said first cam operates said first switch element for independently beginning a continuous rotation of said timer motor and for energizing the solenoid, thereby raising said weighted element and releasing the pushbutton switch to establish a telephone circuit, a second cam operative by said timer motor, a second switch element operative by said second cam during a part of a revolution of said first cam, an answering recorder operative by said second cam and said second switch element for repeating a recorded message to the telephone for a predetermined length of time, a message receiving recorder operative by said first cam and said first switch element for receiving an incoming telephone message following the recorded message, a power switch operable by said lever and connecting said power amplifier to an electric power source when the handset is suspended on the lever, said power switch further being connected in series with said relay, said solenoid and said switch elements, an endless sound tape provided with an elongated notch in said answering recorder, a sound amplifier in said answering recorder, a sound head in said answering recorder, a microswitch normally maintaining said series circuit upon when in engagement with said elongated notch, and closing said circuit for a predetermined period when disengaged from said notch and in contact with the tape's edge.

References Cited in the file of this patent

UNITED STATES PATENTS

| | | |
|---|---|---|
| 2,079,089 | Varley | May 4, 1937 |
| 2,374,842 | Shively | May 1, 1945 |